US009865290B1

(12) United States Patent
Liang et al.

(10) Patent No.: US 9,865,290 B1
(45) Date of Patent: Jan. 9, 2018

(54) SINGLE SURFACE IN-DRIVE ERASE

(71) Applicant: KABUSHIKI KAISHA TOSHIBA, Tokyo (JP)

(72) Inventors: Jiangang Liang, Saratoga, CA (US); Ting-Chun Janet Liu, Cupertino, CA (US); Gary W. Calfee, Santa Clara, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/453,877

(22) Filed: Mar. 8, 2017

(51) Int. Cl.
*G11B 5/09* (2006.01)
*G11B 5/596* (2006.01)
*G11B 5/012* (2006.01)
*G11B 5/024* (2006.01)

(52) U.S. Cl.
CPC .......... *G11B 5/59661* (2013.01); *G11B 5/012* (2013.01); *G11B 5/024* (2013.01)

(58) Field of Classification Search
None
See application file for complete search history.

(56) References Cited

U.S. PATENT DOCUMENTS

| | | | | |
|---|---|---|---|---|
| 4,602,301 A | * | 7/1986 | Saito | G11B 5/016 360/69 |
| 4,866,546 A | * | 9/1989 | Nakagawa | G11B 11/10517 360/61 |
| 5,581,364 A | * | 12/1996 | Hatanaka | B82Y 10/00 386/248 |
| 5,668,679 A | * | 9/1997 | Swearingen | G11B 5/59633 360/75 |
| 8,395,856 B2 | * | 3/2013 | Kim | B82Y 10/00 360/31 |
| 8,634,283 B1 | * | 1/2014 | Rigney | G11B 5/59661 360/75 |
| 2002/0039333 A1 | * | 4/2002 | Tsukahara | G11B 7/094 369/44.36 |
| 2009/0109816 A1 | * | 4/2009 | Usui | G11B 7/1267 369/47.53 |
| 2010/0265613 A1 | * | 10/2010 | Kim | B82Y 10/00 360/57 |

* cited by examiner

*Primary Examiner* — Peter Vincent Agustin
(74) *Attorney, Agent, or Firm* — Patterson & Sheridan, LLP

(57) ABSTRACT

In an in-drive erase process in a single-surface HDD, erase spirals on the surface being erased can be employed to control writer position. A reader-to-writer timing offset value is determined for a plurality of radial locations on the surface to be erased, and an erase window is determined for a radial location disposed between two erase spirals. The erase window includes an erase start time, which is based on a spiral exit time of a reader and the reader-to-writer timing offset value for the radial location, and an erase stop time, which is based on a spiral encounter time of the reader and the reader-to-writer timing offset value. The erase window prevents complete erasure of erase spirals, so that the servo system of the HDD can continue to servo off of the erase spirals. The erase spirals may be written with a lower slope than conventional spiral tracks.

20 Claims, 10 Drawing Sheets

SINGLE SURFACE IN-DRIVE ERASE

BACKGROUND

At various points in the manufacture and use of a hard disk drive (HDD), failures or errors can occur that generally require erasure of servo information, and/or user information extant on the recording surfaces of an HDD. For example, during manufacture, errors may occur that render an HDD unusable, but can be corrected, such as spiral write errors. In the servo self-write (SSW) process, an HDD writes servo information (such as product wedges) for each data track of each recording surface of the HDD while servoing on spiral tracks previously written on a surface of the HDD. Errors in the shape or position of these spiral tracks can prevent sufficiently accurate product wedges from being written causing the HDD to fail the SSW process. To rework an HDD that has failed to successfully complete SSW, new spiral tracks typically cannot simply be rewritten onto a surface of the HDD and the SSW process repeated. This is because obsolete spiral tracks and product wedges remaining on one or more recording surfaces of an HDD can be confused with subsequently rewritten spiral tracks, and therefore interfere with the SSW process, even when the new spiral tracks have no errors. Consequently, the recording surfaces of an HDD need to be erased prior to reworking or refurbishing the HDD.

External equipment may be used to thoroughly erase the data recording surfaces of HDDs prior to repeating SSW, such as media bulk erase devices or servo-track writers. For either device, partial disassembly of the HDD to be erased is generally required, necessitating use of a clean room. Furthermore, setup and use of such external equipment for each individual HDD to be erased is time-consuming and expensive in the context of high-volume manufacturing. Alternatively, an HDD can be configured to erase one or more of its own data recording surfaces by controlling write head position with spiral patterns that are written on a different recording surface than the recording surface being erased. However, for an HDD that has only a single recording surface, such an approach is not possible, since there is no other surface on which to write the spiral patterns used to control the erase process. Accordingly, there is a need in the art for systems and methods facilitating in-drive erasure of recording surfaces in a single-surface HDD.

SUMMARY

One or more embodiments provide systems and methods for an in-drive erase process for erasing the recording surface of a single-surface hard disk drive. A set of erase spirals is written on the recording surface of the hard disk drive at a different write frequency than that of other data patterns on the recording surface, and is used to control an erase process on that disk surface. As part of the erase process, an erase window is determined, during which an erase pattern, such as a series of alternating 1's and 0's, is written at a radial location on the recording surface between two adjacent erase spirals. The erase window prevents the erase spirals from being completely overwritten by the erase pattern. To that end, the erase window includes an erase start time, at which the writer begins writing an erase pattern at the radial location, and an erase stop time, at which the writer discontinues writing the erase pattern. The erase stop time is based on a spiral encounter time of a reader and a reader-to-writer timing offset value, and the erase start time is based on a spiral exit time of the reader and the reader-to-writer timing offset value. Because the erase spirals are not completely erased during the erase process, the erase spirals can be located on the same recording surface that is undergoing the erase process.

A method of erasing a data recording surface of a data storage device, according to an embodiment, includes the steps of controlling a writer to write a spiral track on the data recording surface and, while controlling the writer at a radial location on the data recording surface based on time and position information included in the spiral track, controlling the writer to write an erase pattern on the data recording surface by (i) determining a spiral encounter time at which a reader associated with the writer will cross a leading edge of the spiral track at the radial location, (ii) determining an erase stop time based on the spiral encounter time and a reader-to-writer timing offset value, and (iii) controlling the writer to discontinue writing the erase pattern at the erase stop time.

A data storage device, according to an embodiment, comprises a writable surface and a controller. The controller is configured to control a writer to write a spiral track on the writable surface; and while controlling the writer at a radial location on the writable surface based on time and position information included in the spiral track, control the writer to write an erase pattern on the writable surface by (i) determining a spiral encounter time at which a reader associated with the writer will cross a leading edge of the spiral track at the radial location, (ii) determining an erase stop time based on the spiral encounter time and a reader-to-writer timing offset value, and (iii) controlling the writer to discontinue writing the erase pattern at the erase stop time.

BRIEF DESCRIPTION OF THE DRAWINGS

So that the manner in which the above recited features of embodiments of the invention can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
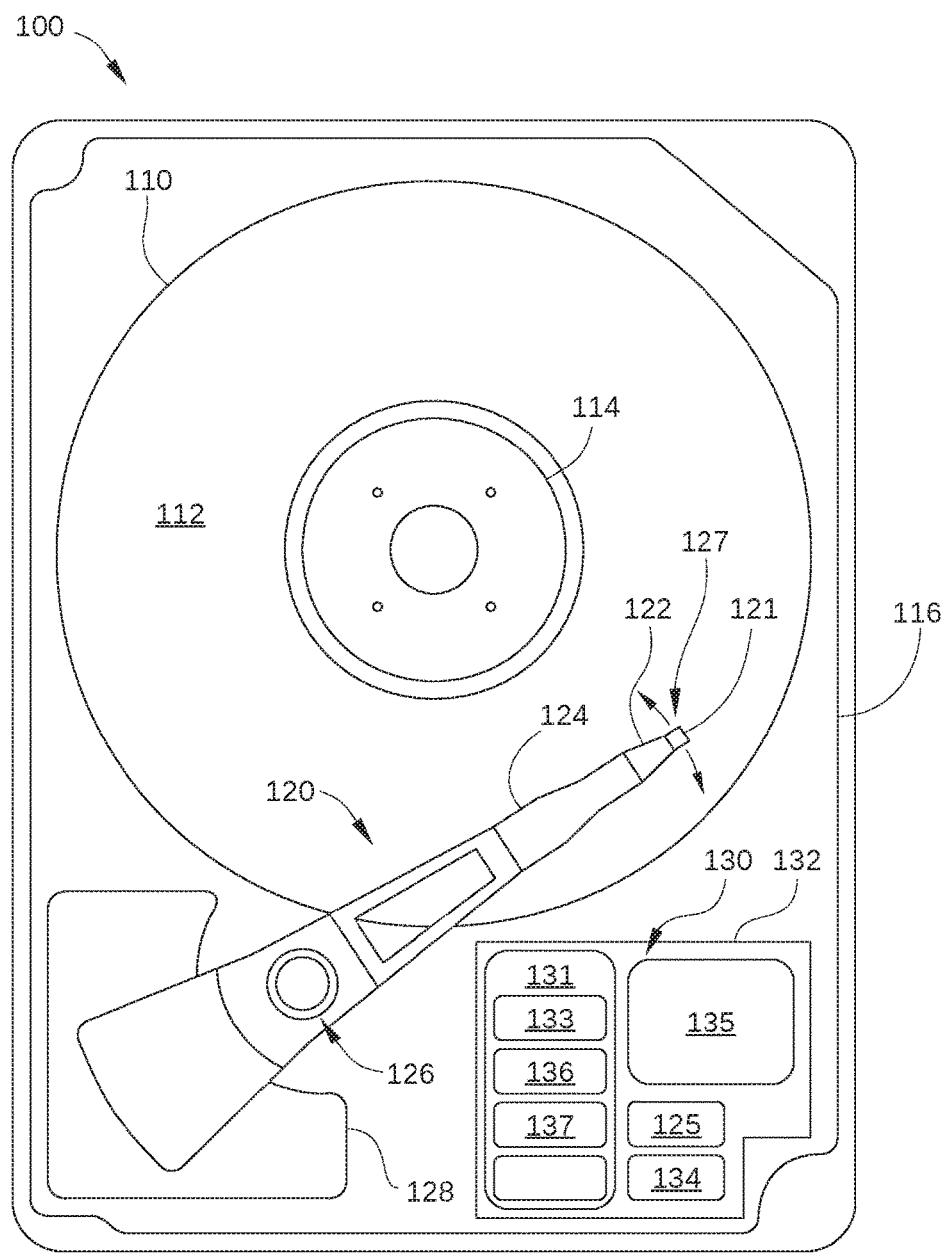
FIG. 1 is a schematic view of an exemplary hard disk drive, according to one embodiment.

FIG. 1 is a schematic view of an exemplary hard disk drive, according to one embodiment. For clarity, hard disk drive (HDD) 100 is illustrated without a top cover. HDD 100 includes a single storage disk 110 that is rotated by a spindle motor 114 and includes a plurality of concentric data storage tracks are disposed on a single surface 112 of storage disk 110. Spindle motor 114 is mounted on a base plate 116. An actuator arm assembly 120 is also mounted on base plate 116, and has a slider 121 mounted on a flexure arm 122 with a magnetic read/write head 127 that reads data from and writes data to the data storage tracks. Flexure arm 122 is attached to an actuator arm 124 that rotates about a bearing assembly 126. Voice coil motor 128 moves slider 121 relative to storage disk 110, thereby positioning read/write head 127 over a desired concentric data storage track. Spindle motor 114, read/write head 127, and voice coil motor 128 are coupled to electronic circuits 130, which are mounted on a printed circuit board 132.

Electronic circuits 130 include a read channel 137, a microprocessor-based controller 133, random-access memory (RAM) 134 (which may be a dynamic RAM and is used as a data buffer) and/or a flash memory device 135 and a flash manager device 136. In some embodiments, read channel 137 and microprocessor-based controller 133 are included in a single chip, such as a system-on-chip 131. In some embodiments, HDD 100 may further include a motor-driver chip 125 that accepts commands from microprocessor-based controller 133 and drives both spindle motor 114 and voice coil motor 128. Read/write channel 137 communicates with the read/write head 127 via a preamplifier (not shown) that may be mounted on a flex-cable that is itself mounted on either base 116, actuator arm 120, or both.

When data are transferred to or from storage disk 110, actuator arm assembly 120 sweeps an arc between the inner diameter (ID) and outer diameter (OD) of storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to storage disk 110. Voice coil motor 128 is coupled with a servo system known in the art that uses the positioning data read from servo wedges on storage disk 110 by read/write head 127 to determine the position of read/write head 127 over a specific data storage track. The servo system determines an appropriate current to drive through the voice coil of voice coil motor 128, and drives said current using a current driver and associated circuitry.

In order for HDD 100 to perform SSW or the herein-described single-surface erase process, position and timing information are provided to the servo system of HDD 100 so that HDD 100 can control read/write head 127 with the necessary precision for writing servo wedges or performing an in-drive erase process. Servo wedges generally contain servo information that is located in servo sectors of the concentric data storage tracks on storage disk 110 and is read by read/write head 127 during read and write operations to position read/write head 127 above a desired data storage track. The position and timing information that enables the internal servo system of HDD 100 to perform SSW is typically in the form of reference spiral tracks that are written on disk surface 112, and are referred to as "servo spirals" or "spiral tracks." During the SSW process, read/write head 127 is positioned relative to surface 112 based on the servo spirals, so that the final servo information on surface 112 can be written by read/write head 127.

According to some embodiments, an in-drive erase process that is in some ways similar to the SSW process is enabled via servo spirals written on surfaces 112 of HDD 100. These servo spirals are referred to herein as "erase spirals." Unlike conventional servo spirals, erase spirals are written onto disk surface 112 after HDD 100 has begun or completed SSW, and an error of some sort has occurred. One embodiment of such erase spirals is illustrated in FIG. 2.

Figure 2:
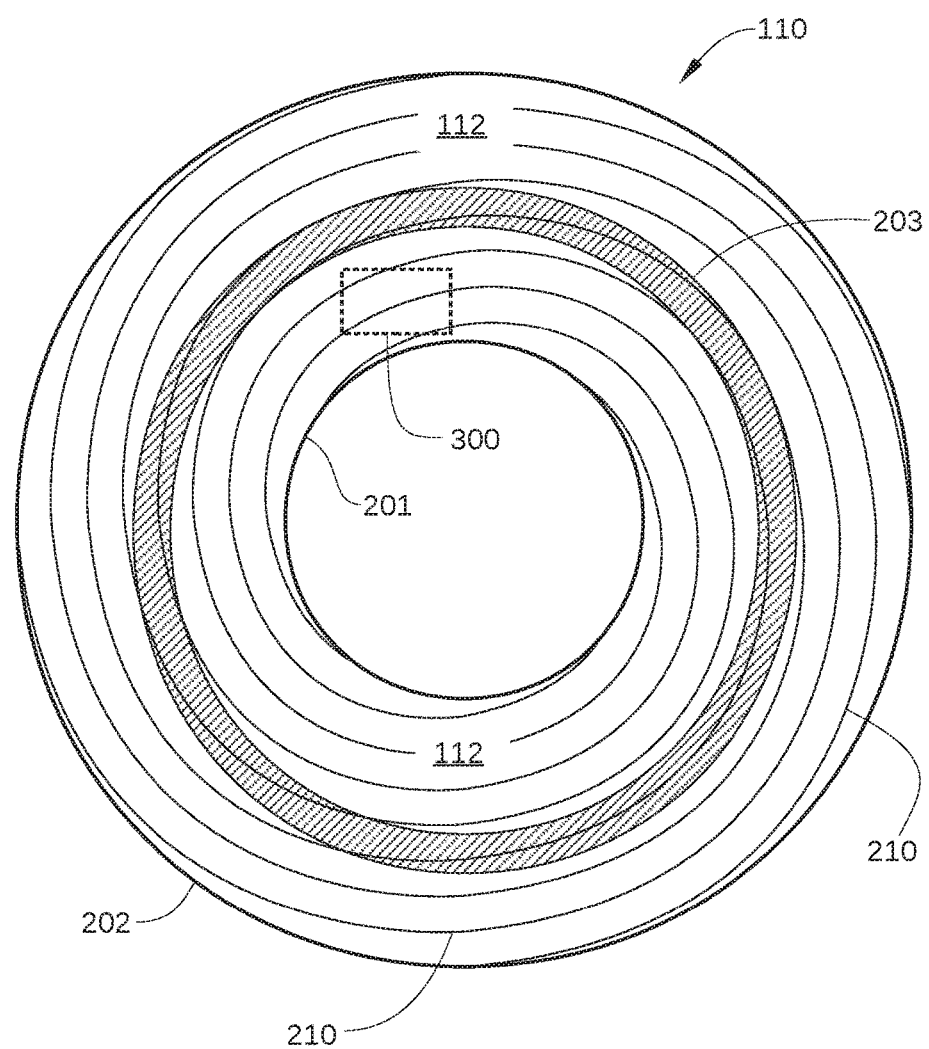
FIG. 2 schematically illustrates a partial side-view of a hard disk drive configured with multiple storage disks and multiple read/write heads, according to an embodiment.

FIG. 2 illustrates storage disk 110 prior to undergoing an in-drive erase process, according to one embodiment. As shown, storage disk 110 has a plurality of erase spirals 210 written thereon that are circumferentially spaced apart from adjacent erase spirals 210, and typically are each written continuously on recording surface 112 from an ID 201, across a mid-diameter region 203, to an OD 202 of storage disk 110. Erase spirals 210 may be written on surface 112 of storage disk 110 by any technically feasible approach or combination of approaches. For example, in some embodiments, erase spirals 210 are "bootstrap spirals" or "seed spirals," which are servo spirals written onto surface 112 using read/write head 127 and the servo system of HDD 100. Thus, erase spirals 210 may be written without external actuators and without disassembly of HDD 100. According to some embodiments, erase spirals 210 are employed as coarse guide spirals that enable an in-drive erase process using closed-loop control in the servo system of HDD 100. That is, an erase pattern can be written while the servo system of HDD 100 uses closed-loop tracking of erase spirals 210. It is noted that the number of erase spirals 210 written on storage disk 110 may be larger than that shown in FIG. 2, for example 10, 20, 30, or more.

In some embodiments, erase spirals 210 are written on surface 112 using a write frequency that is a different frequency than any signal frequency associated with data patterns previously written on the spiral surface, such as spiral tracks, product wedges, other servo data, user data, and the like. Thus, the signal frequency associated with erase spirals 210 is a different frequency than that generated by any data patterns previously written on surface 112. As a result, erase spirals 210 can remain on surface 112 after an erase process without affecting subsequent SSW operations.

Figure 3:
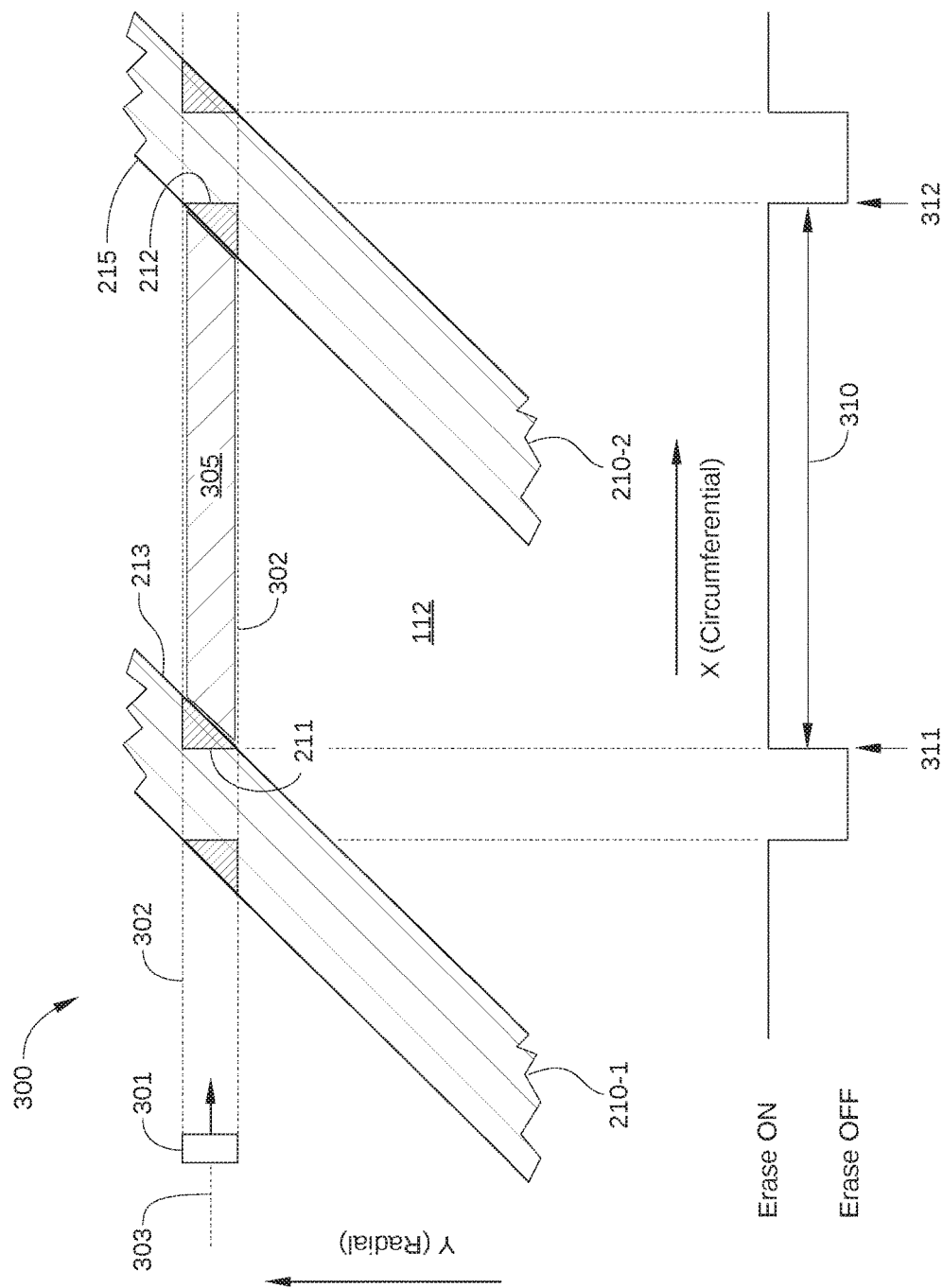
FIG. 3 illustrates one of the storage disks of the hard disk drive of FIG. 1 prior to undergoing an in-drive erase process, according to one embodiment.

FIG. 3 is a schematic illustration of a portion 300 of storage disk 110 indicated in FIG. 2 undergoing an erase process. As shown, a writer 301 follows a path 302 over multiple erase spirals 210-1 and 210-2 at a radial location 303 on storage disk 110. Displacement along the x-axis in FIG. 3 is illustrated in terms of angular (or circumferential) displacement, such as radians or degrees, while displacement along the y-axis is illustrated in terms of linear (or radial) displacement. As writer 301 follows path 302, writer 301 generates an erase pattern (not shown), such as a series of high-frequency transitions that are generally interpreted as alternating 1's and 0's, thereby removing any previously written data patterns in path 302. Assuming constant rotational velocity of storage disk 110, displacement of writer 301 along the x-axis in FIG. 3 due to rotation of storage disk 110 corresponds to the passage of time.

According to embodiments, writer 301 does not continuously generate the above-described erase pattern at radial location 303. Instead, HDD 100 is configured to control writer 301 to generate the erase pattern on a portion of surface 112 disposed between erase spirals 210-1 and 210-2, i.e., erase region 305. As a result, erase spirals 210-1 and 210-2 are not completely overwritten by the erase pattern. To that end, writer 301 is controlled to write the erase pattern on surface 112 during an erase window 310, and is controlled to discontinue writing the erase pattern outside erase window 310. As shown, erase window 310 includes an erase start time 311 and an erase stop time 312. To ensure that all unwanted data patterns at radial location 303 are overwritten with the erase pattern, in some embodiments, erase start time 311 is selected so that writer 301 may be disposed at least partially over a region 211 that includes a trailing edge 213 of erase spiral 2101. In addition, erase stop time 312 is selected so that writer 301 may be disposed at least partially over a region 212 that includes a leading edge 215 of erase spiral 2102. Thus, in such embodiments, region 211 of erase spiral 2101 and region 212 of an adjacent erase spiral 2102 are overwritten by the erase pattern generated by writer 301. In addition, none of erase region 305, which is disposed along radial location 303 between the first erase spiral 2101 and the adjacent erase spiral 2102, remains free of the erase pattern generated by writer 301.

The servo system of HDD 100 uses the timing and position information provided by the above-described erase spirals 210-1 and 210-2 to precisely servo writer 301 over radial location 303. More specifically, while a reader (not shown) of read/write head 127 reads position and timing information from reference spirals 210-1 and 210-2, writer 301 is used to write the erase pattern over radial position 303. However, writer 301 is not co-located with the reader of read/write head 127, and instead is physically offset from the reader. Therefore, there is typically a timing offset between when writer 301 encounters trailing edge 213 of erase spiral 210-1 and when the reader of read/write head 127 encounters trailing edge 213. Consequently, erase start time 311 generally does not coincide with the time that the reader encounters trailing edge 213. Instead, erase start time 311 can be determined based on a time that the reader encounters trailing edge 213 modified by the above-described timing offset. Similarly, the same timing offset is present between when writer 301 encounters leading edge 215 of erase spiral 210-2 and the reader of read/write head 127 encounters leading edge 215. Thus, erase stop time 312 can be determined based on a time that the reader encounters leading edge 215 modified by the above-described timing offset. One such timing offset is described below in greater detail in FIG. 4.

Figure 4:
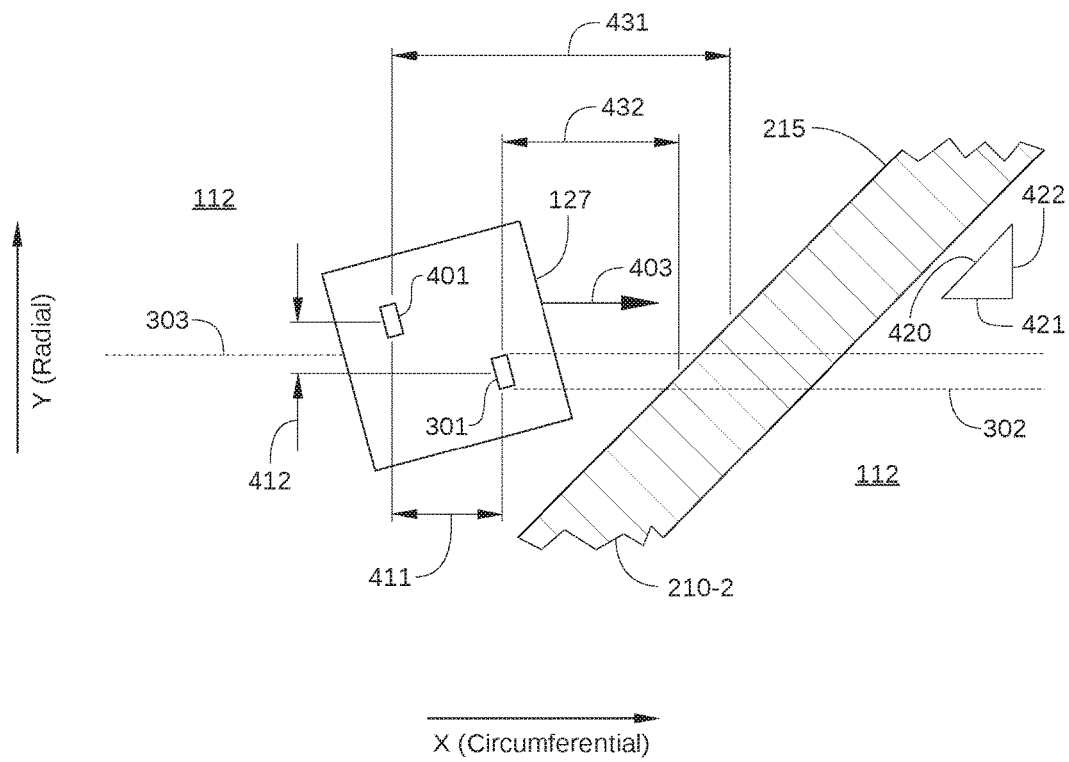
FIG. 4 sets forth a flowchart of method steps for an in-drive erase process, according to an embodiment.

FIG. 4 schematically illustrates read/write head 127 moving across surface 112 of storage disk 110 during an erase process, according to an embodiment. As shown, read/write head 127 includes a reader 401 and writer 301, which are the read element and write element, respectively, for read/write head 127. Also shown are reference spiral 210-2 and path 302 being followed by writer 301, and arrow 403 indicating the direction of circumferential motion of read/write head 127 relative to surface 112 during an erase process. Writer 301 is disposed on read/write head 127 with a reader/writer circumferential offset 411 and a reader/writer radial offset 412 from reader 401.

Reader/writer circumferential offset 411 represents the circumferential offset (i.e., the physical offset along the x-axis) between reader 401 and writer 301 at the current radial position 303. Reader/writer radial offset 412 represents the radial offset (i.e., the physical offset along the y-axis) between reader 401 and writer 301 at the current radial position 303. Due to the curved stroke of actuator arm assembly 120 (shown in FIG. 1), read/write head 127 varies in angular orientation with respect to the x-axis based on the current radial location 303 of read/write head 127, and generally is not oriented orthogonally to the x-axis. Consequently, reader/writer circumferential offset 411 and reader/writer radial offset 412 each vary as a function of the radial location of read/write head 127. Together with a slope 420 of reference spiral 210-2 at radial location 303, reader/writer circumferential offset 411 and reader/writer radial offset 412 can be used to calculate a reader-to-writer timing offset.

Slope 420 of reference spiral 210-2 may be associated with a specific location on reference spiral 210-2, such as radial location 303. Alternatively, slope 420 may be associated with a portion or segment of a reference spiral 210. In some embodiments, slope 420 may be defined as the ratio of a circumferential angular displacement 421 to a radial linear displacement 422 of reference spiral 210-2 at the specific portion or location. In other embodiments, slope 420 may be defined as the ratio of radial linear displacement 422 to circumferential angular displacement 421. Furthermore, any other applicable definition of "slope," "pitch," or "gradient" may be used to quantify slope 420 at a specific location on reference spiral 210-2 or for a specific portion of reference spiral 210-2.

In the scenario illustrated in FIG. 4, reader 401 will encounter leading edge 215 of erase spiral 210-2 after a time interval 431 (represented graphically as circumferential displacement in FIG. 4), and writer 301 will encounter leading edge 215 after time interval 432 (also represented graphically as circumferential displacement). Thus, the reader-to-writer timing offset at radial location 303 is the difference between time interval 432 and time interval 431. That is, if reader 401 is estimated by the servo system of HDD 100 to encounter leading edge 215 at a time T, writer 301 can be assumed to encounter leading edge 215 at time T plus the reader-to-writer timing offset, or T+(time interval 432−timer interval 431). Consequently, erase stop time 312 for the erase window 310 of FIG. 3 can be determined by modifying a time that reader 401 will encounter leading edge 215 with the above-described timing offset. Similarly, when the reader-to-writer timing offset for radial location 303 is known, erase stop time 311 for the erase window 310 of FIG. 3 can be determined by modifying a time that reader 401 will encounter trailing edge 213 with the above-described timing offset.

It is noted that the reader-to-writer timing offset associated with radial location 303 is not simply equal to reader/writer circumferential offset 411. This is because erase spirals 210 have a slope 420 in the x-y plane, so the reader-to-writer timing offset at radial location 303 is also affected by reader/writer radial offset 412. Thus, while read/write head 127 is defined as being located at a single radial location 303, for the proper calculation of the reader-to-writer timing offset at radial location 303, the fact that writer 301 and reader 401 are each located at slightly different radial locations over surface 112 is considered. That is, the reader-to-writer timing offset at radial location 303 is a function of reader/writer circumferential offset 411, reader/writer radial offset 412, and slope 420. The nominal value of slope 420, i.e., the value of slope 420 for an ideally written erase spiral 210, is a known value. Reader/writer circumferential offset 411 and reader/writer radial offset 412 can be readily determined for a particular radial location 303 based on the measured or estimated value of a radial gap, $g_r$, and a longitudinal gap, $g_l$ present between reader 401 and writer 301. Radial gap g and longitudinal gap $g_l$ are described below in conjunction with FIGS. 5 and 6.

Figure 5:
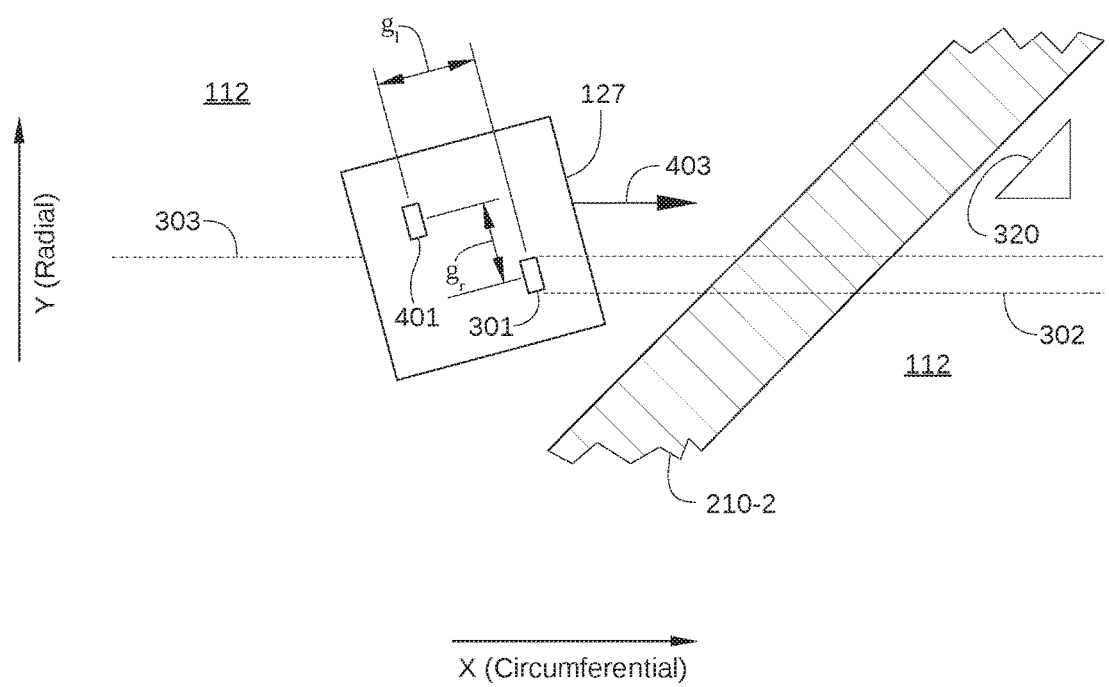
FIG. 5 schematically illustrates a radial gap and a longitudinal gap between a reader and a writer of the read/write head of FIG. 1, according to an embodiment.

FIG. 5 schematically illustrates radial gap $g_r$ and longitudinal gap $g_l$ between reader 401 and writer 301 of read/write head 127, according to an embodiment. As shown, radial gap $g_r$ is illustrated as a radial offset between reader 401 and writer 301 of read/write head 127, where in this context, "radial" references the radial motion of actuator arm assembly 120 with respect to bearing assembly 126 when actuator arm assembly rotates. In addition, longitudinal gap $g_l$ is illustrated as a longitudinal offset between reader 401 and writer 301 of read/write head 127, where "longitudinal" references the major axis of actuator arm assembly 120. Thus, radial gap $g_r$ and longitudinal gap $g_l$ are constant offsets describing the relative positions of reader 401 and writer 301 on read/write head 127, and are independent of the orientation of read/write head 127 with respect to surface 112. In some embodiments, the nominal values for radial gap $g_r$ and longitudinal gap $g_l$ for a particular configuration of HDD 100 may be sufficiently accurate for determining reader/writer circumferential offset 411 and reader/writer radial offset 412. However, in other embodiments, the values for radial gap $g_r$ and longitudinal gap $g_l$ for a particular manufactured instance of read/write head 127 may include sufficient manufacturing variation such that reader/writer circumferential offset 411 and reader/writer radial offset 412 cannot be calculated with sufficient accuracy to provide a useful value for the above-described reader-to-writer timing offset. In such embodiments, the values for radial gap g and longitudinal gap $g_l$ for a particular manufactured instance of read/write head 127 can be determined by solving a system of two equations in which the values of the other variables are all known. One such embodiment is described below in conjunction with FIG. 6.

Figure 6:
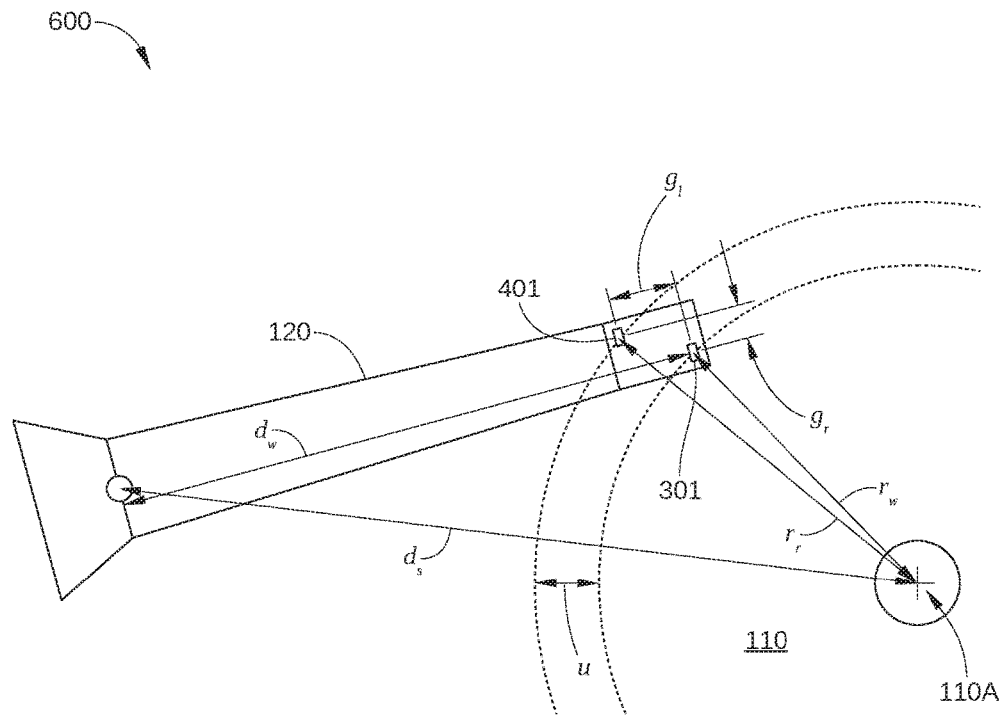
FIG. 6 schematically illustrates a geometrical layout of the actuator arm assembly and storage disk of FIG. 1 for determining the values for a radial gap and a longitudinal gap for a particular manufactured instance of a read/write head, according to embodiments.

FIG. 6 schematically illustrates a geometrical layout 600 of actuator arm assembly 120 and storage disk 110 for determining the values for radial gap g and longitudinal gap $g_l$ for a particular manufactured instance of read/write head 127, according to embodiments. In such embodiments, a function describing the relationship of micro-jog u to various geometric parameters of HDD 100 is employed to determine values for radial gap $g_r$ and longitudinal gap gi. As shown, micro-jog u is the radial offset between reader 401 and writer 301 at a particular radial location 303 over surface 112. The variation of micro-jog u across the stroke of actuator arm assembly 120 typically follows a well-defined curve with respect to the radial position of read/write head 127, and may be determined by drive and head geometry. Therefore, micro-jog u can be computed from, and is a function of, dimensions $d_s$, $d_w$, $g_r$, $g_l$, and $r_w$. Thus, u=f($d_s$, $d_w$, $g_r$, $g_l$, $r_w$), where f is a nonlinear function that can be derived from by well-known trigonometric techniques. As shown in FIG. 6, $d_s$=the distance between the pivot point of arm actuator arm assembly 120 and the disk center 110A of storage disk 110; $d_w$=the distance between the pivot point of arm actuator arm assembly 120 and writer 301; $g_r$=the radial offset between reader 401 and writer 301; $g_l$=the longitudinal offset between reader 401 and writer 301; $r_w$=the distance between disk center 110A and a center point of writer 301, i.e., the radial location of writer 301; and $r_r$=the distance between disk center 110A and a center point of reader 401, i.e., the radial location of reader 401.

In a typical disk drive, $d_s$ and $d_w$ are accurately controlled by the manufacturing process, and dimension $r_w$ is accurately controlled by the servo system of HDD 100. By contrast, $g_r$ and $g_l$ may vary significantly for each manufactured instance of read/write head 127 due to manufacturing process inaccuracies, so these dimensions may not be exactly known and require calibration. It is noted that g and gi are two independent variables in the function u=f($d_s$, $d_w$, $g_r$, $g_l$, $r_w$). Thus, the values for $g_r$ and $g_l$ for a particular manufactured instance of read/write head 127 can be determined by solving a system of two equations in which the values of micro-jog u and the variables $d_s$, $d_{w, l}$, and $r_w$ are all known. Specifically, by writing short bands of servo sectors that define data tracks at two different radial locations ($r_{w1}$ and $r_{w2}$), micro-jog u at those locations, i.e., micro-jog $u_1$ and $u_2$, can be measured by HDD 100. Substituting the known values micro-jog $u_1$ and $r_{w1}$ into the function u=f($d_s$, $d_w$, $g_r$, $g_l$, $r_w$) yields Equation 1 and substituting the known values micro-jog $u_2$ and $r_{w2}$ into the function u=f($d_s$, $d_w$, $g_r$, $g_l$, $r_w$) yields Equation 2:

$$u_1 = f(d_s, d_w, g_r, g_l, r_{w1}) \quad (1)$$

$$u_2 = f(d_s, d_w, g_r, g_l, r_{w2}) \quad (2)$$

Equations 1 and 2 can be solved simultaneously to determine the values for $g_r$ and $g_l$ for the particular manufactured instance of read/write head 127 being calibrated. Once the values for $g_r$ and $g_l$ for the particular manufactured instance of read/write head 127 have been determined, reader/writer circumferential offset 411 and reader/writer radial offset 412 can be calculated for any radial location of read/write head 127. Then, for each radial location of read/write head 127, a reader-to-writer timing offset can be determined based on the reader/writer circumferential offset 411 and the reader/writer radial offset 412 calculated for that radial location. In some embodiments, the reader-to-writer timing offset is stored as a function or look-up table, for example in RAM 134, for use during an erase process.

As described above in conjunction with FIG. 3, in some embodiments, erase window 310 may be timed to start and/or stop when writer 301 is positioned over a leading edge or trailing edge of a reference spiral 210, thereby ensuring that all unwanted data patterns at a particular radial location on surface 112 are overwritten with an erase pattern. In some embodiments, to further ensure that all unwanted data patterns at a particular radial location on surface 112 are overwritten with an erase pattern, for example due to inaccurately written erase spirals, erase start time 311 and/or erase stop time 312 may be adjusted so that erase window 310 is widened.

In such embodiments, erase start time 311 may be adjusted so that more than just region 211 in FIG. 3 is overwritten at the beginning of erase window 310. For example, erase start time 311 may be adjusted to occur some period of time before the time indicated by modifying the time that reader 401 encounters trailing edge 213 with the reader-to-writer timing offset. Similarly, erase stop time 312 may be adjusted so that more than just region 212 in FIG. 3 is overwritten at the end of erase window 310. For example, erase stop time 312 may be adjusted to occur some period of time after the time indicated by modifying the time that the reader encounters leading edge 215 with the reader-to-writer timing offset. In such embodiments, significant portions of erase spirals 210 can be overwritten with an erase pattern. Such overwritten portions of erase spirals 210 can no longer provide timing and position information to the servo system of HDD 100, and the number of sync marks recognized by the servo system of HDD 100 is reduced. A reduced number of sync marks has a deleterious effect on the read signal associated with erase spirals 210, as illustrated in FIGS. 7 and 8.

Figure 7:
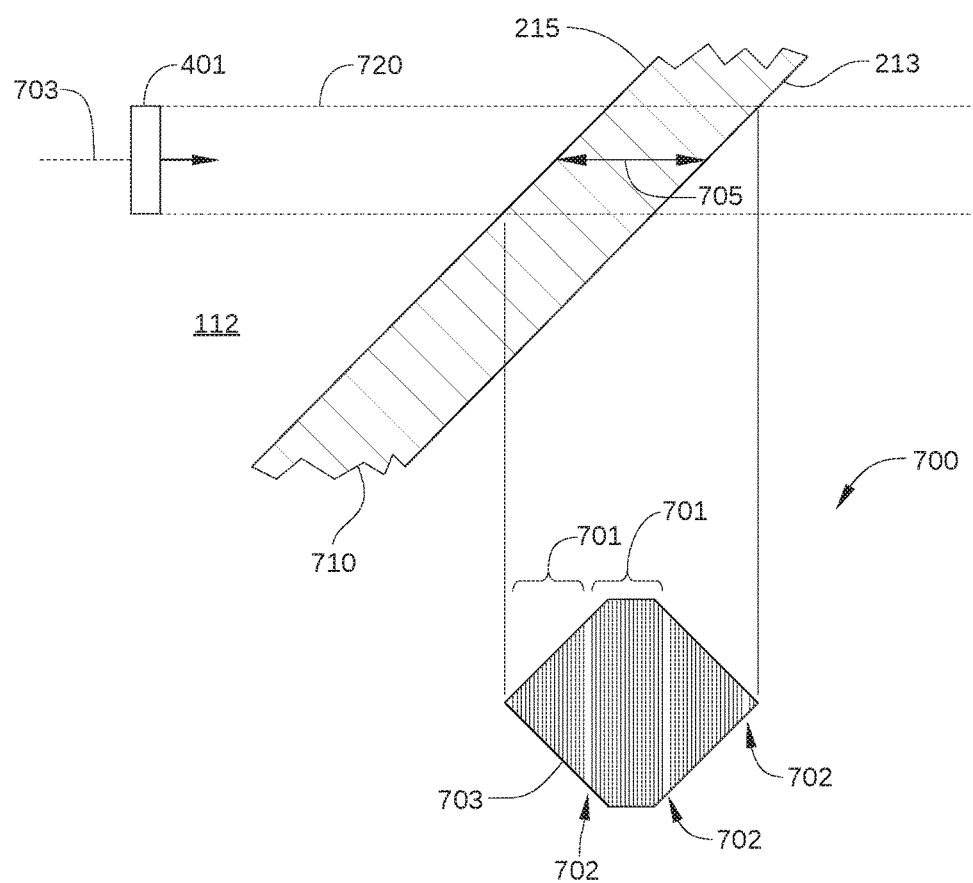
FIG. 7 is a schematic illustration of a read signal that is generated when a reader passes over an erase spiral, according to one embodiment.

FIG. 7 is a schematic illustration of a read signal 700 that is generated when reader passes over an erase spiral 710, according to one embodiment. For reference, FIG. 7 also schematically illustrates a path 720 of reader 401 as read/write head 127 crosses the erase spiral associated with read signal 700. In FIG. 7, signal amplitude of read signal 700 is indicated vertically and signal duration of read signal 700 is indicated horizontally. Read signal 700 includes a plurality of high-frequency transitions 701 interrupted by sync marks 702. High-frequency transitions 701 correspond to the constant high-frequency pattern included in erase spiral 710 being crossed by reader 401, while sync marks 702 correspond to the synchronization marks included in erase spiral 710 being crossed by reader 401. Read signal 700 also includes an envelope 703, which is a substantially smooth curve that outlines the extremes of the oscillating signal associated with high-frequency transitions 701 and sync marks 702.

When read/write head 127 moves in the radial direction over storage disk 110, envelope 703 will shift (left or right in FIG. 7) with respect to sync marks 703. Thus, a shift in the position of envelope 703 relative to sync marks 702 provides position-error signal (PES) for servoing read/write head 127. Accurate positioning of read/write head 127 is generally facilitated when read signal 700 includes at least a minimum number of sync marks. For example, if a particular read signal 700 only includes one or two sync marks 702, the position of read/write head 127 cannot be as precisely located as when read signal 700 includes four, five, or more sync marks 702. Generally, the number of sync marks 702 included in envelope 703 of a particular read signal 700 is a function of slope 420 and width 705 of erase spiral 710 at the radial location at which erase spiral 710 is being traversed by reader 401.

Figure 8:
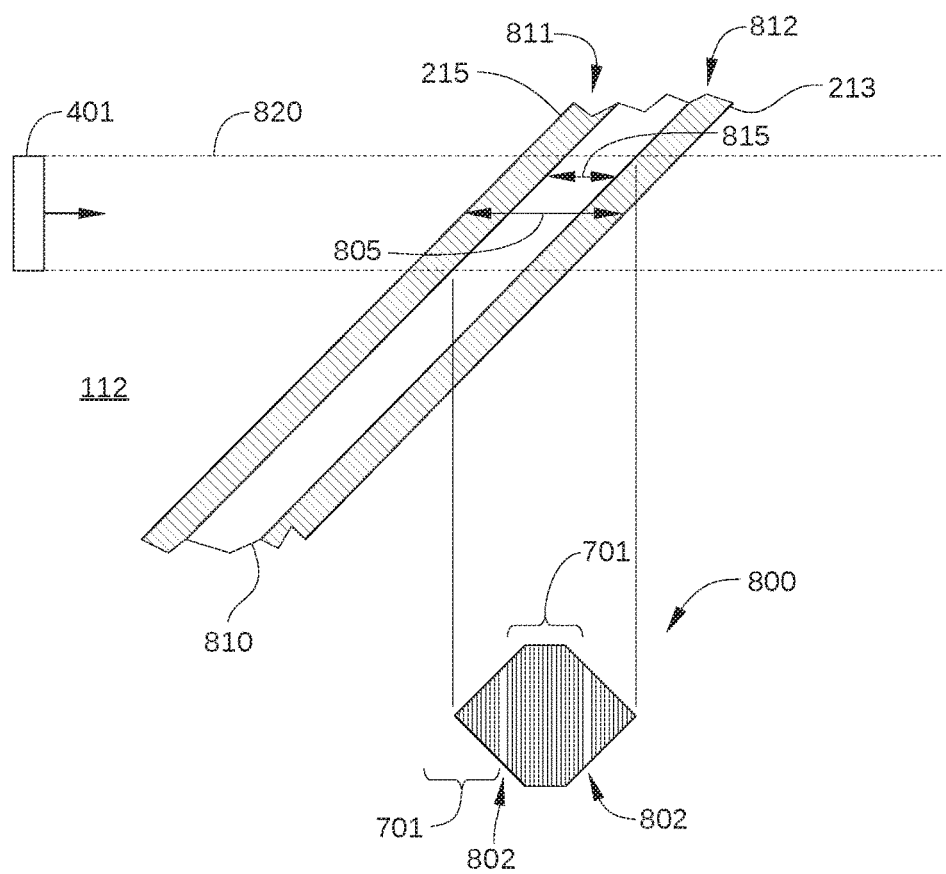
FIG. 8 is a schematic illustration of a read signal that is generated when a reader passes over a partially overwritten erase spiral, according to one embodiment.

FIG. 8 is a schematic illustration of a read signal 800 that is generated when reader passes over a partially overwritten erase spiral 810, according to one embodiment. For reference, FIG. 8 also schematically illustrates path 820 of reader 401 as read/write head 127 crosses partially overwritten erase spiral 810. As shown, partially overwritten erase spiral 810 has an original width 805 and a reduced width 815. When first formed on surface 112, partially overwritten erase spiral 810 has original width 805. However, after leading edge portion 811 (cross-hatched) and trailing edge portion 812 (cross-hatched) are overwritten by an erase pattern during an erase process on surface 112, some or all of partially overwritten erase spiral 810 has reduced width 815. Thus, during the erase process on surface 112, read signal 800 includes a reduced number of sync marks 802, as shown, for example as few as one or two. Thus, when portions of erase spirals are overwritten with an erase pattern, the read signal provided by such erase spirals may include an insufficient number of sync marks for a robust erase process.

In light of the above, according to some embodiments, erase spirals are written on surface 112 at a slower spiral write speed and with a lower slope than conventional reference spirals, thereby increasing the time of encounter for reader 401 when such erase spirals are crossed by read/write head 127. Thus, the number of sync marks recognized by the servo system of HDD 100 is increased when read/write head 127 passes over such erase spirals. As a result, there is significantly less likelihood that the ability of servo system of HDD 100 to servo off of the erase spirals is affected by leading edge and/or trailing edge portions of the erase spirals being overwritten with an erase pattern. One such embodiment is illustrated in FIG. 9.

Figure 9:
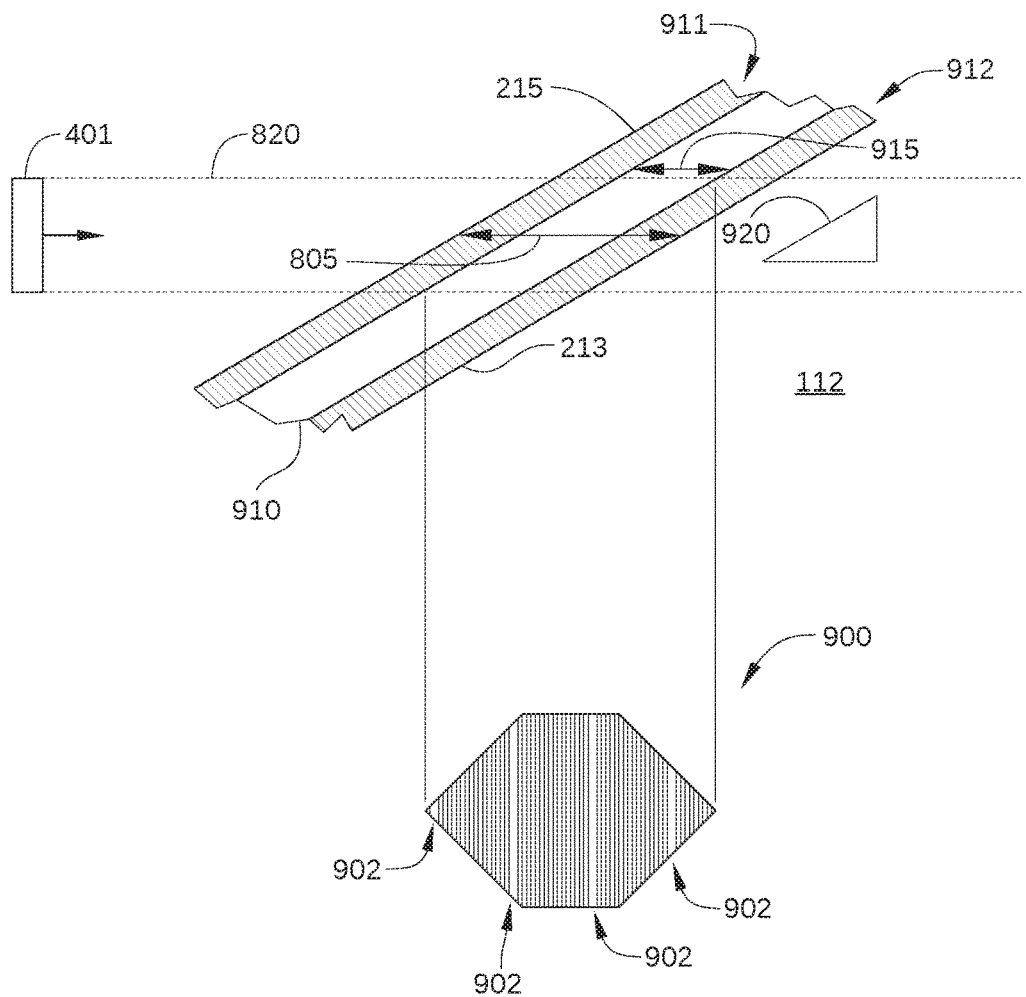
FIG. 9 is a schematic illustration of a read signal that is generated when a reader passes over an erase spiral that has been written with a reduced spiral write speed, according to one embodiment.

FIG. 9 is a schematic illustration of a read signal 900 that is generated when reader 401 passes over an erase spiral 910 that has been written with a reduced spiral write speed, according to one embodiment. For reference, FIG. 9 also schematically illustrates a path 920 of reader 401 as read/write head 127 crosses erase spiral 910. As shown, erase spiral 910 has an original width 905 and a reduced width 915. When first formed on surface 112, erase spiral 910 has original width 905, and after leading edge portion 911 (cross-hatched) and trailing edge portion 912 (cross-hatched) are overwritten by an erase pattern, some or all of erase spiral 910 has reduced width 915. However, erase spiral 910 is written at a reduced spiral write speed, for example on the order of 100-200 mm/sec. Consequently, slope 920 of erase spiral 910 is significantly lower than slope 420 of erase spirals 210. As a result, even though a trailing edge region 911 and leading edge region 912 of erase spiral 910 have been overwritten with an erase pattern, erase spiral 910 generally includes at least a minimum number of sync marks 902 to facilitate accurate positioning of read/write head 127, for example three or more. Thus, by writing erase spiral 910 with a reduced spiral write speed, a read signal generated when reader 401 passes over erase spiral 910 is more likely to include at least a minimum number of sync marks 902 during an erase process.

Figure 10:
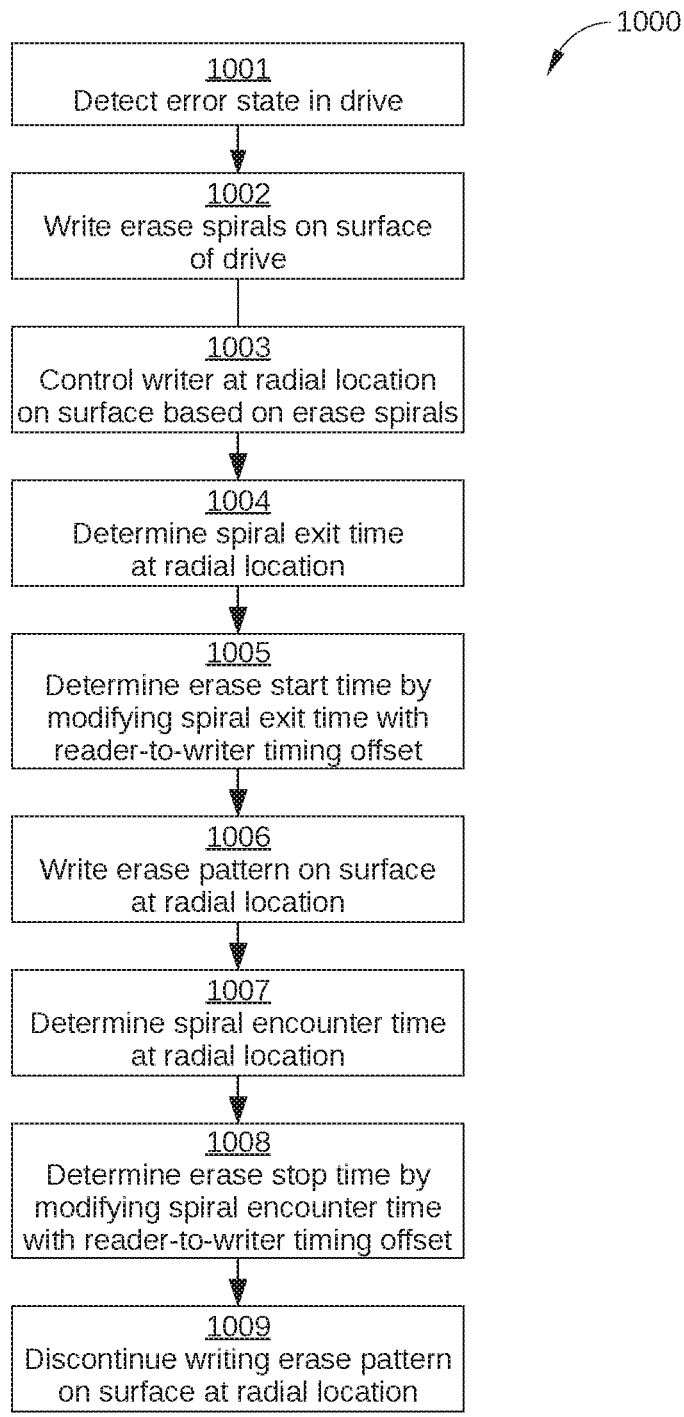
FIG. 10 sets forth a flowchart of method steps for an in-drive erase process, according to an embodiment.

FIG. 10 sets forth a flowchart of method steps for an in-drive erase process, according to an embodiment. Although the method steps are described in conjunction with HDD 100 in FIGS. 1-9, persons skilled in the art will understand that the method steps may be performed with other data storage devices. The control algorithms for the method steps may reside in and/or be performed by microprocessor-based controller 133, an external host device that is temporarily coupled to HDD 100, or any other suitable control circuit or system.

Prior to the method steps, microprocessor-based controller 133 (or any other suitable control circuit or system) calculates a reader-to-writer timing offset for HDD 100. The reader-to-writer timing offset is based on a radial offset between the writer and the reader on read/write head 127, a circumferential offset between the writer and the reader, and a slope of erase spirals 210 that are used in an erase process. In some embodiments, nominal values for the radial offset and the circumferential offset are employed to determine the reader-to-writer timing offset at a plurality of radial locations, whereas in other embodiments, the radial offset and the circumferential offset are measured for a particular manufacturing instance of HDD 100. For example, the radial offset and the circumferential offset may be measured as part of the micro-jog measurement included in a self-test process for HDD 100. In some embodiments, the radial locations for which the reader-to-writer timing offset is calculated are located in mid-diameter region 203 of storage disk 110, whereas in other embodiments the radial locations are located across most or all of the stroke of actuator arm assembly 120.

As shown, method 1000 begins at step 1001, where microprocessor-based controller 133 (or any other suitable control circuit or system) detects an error state in HDD 100. For example, microprocessor-based controller 133 may fail a self-test, such as that performed upon completion of SSW, indicating that SSW must be performed again and erasure of disk surface 112 should therefore be initiated. In another example, microprocessor-based controller 133 may receive a signal from an external host indicating that HDD 100 has suffered a fault requiring erasure of disk surface 112.

In step 1002, microprocessor-based controller 133 (or any other suitable control circuit or system) writes a set of erase spirals 210 on surface 112. Various in-drive procedures are known in the art for writing bootstrap spirals on surface 112, including the use of open-loop and/or closed-loop control of read/write head 127. In practice, such procedures may not generate the high quality servo spirals that are typically employed for an error-free and robust SSW process, i.e., spirals that are evenly spaced circumferentially and with precise and constant slope. However, an in-drive erase process is a significantly lower tolerance process than an SSW process. Specifically, during SSW, precise positioning of a writer included in read/write head 127 during each revolution of storage disk 110 is critical for forming product wedges that provide error-free operation of the HDD. By contrast, during in-drive erase, imprecise positioning of the writer while servoing on erase spirals 210 can be readily compensated for, so that the media surface being treated is thoroughly erased.

For example, in some embodiments, while servoing over the same radial location, the erase process may be performed for multiple revolutions. Additionally or alternatively, for each revolution (or set of revolutions) of the media, the read/write head may radially seek across the media for a distance that is less than the width of a data storage track of the HDD, such as one half of track width, one third of a track width, or less. In this way, the write head performing the erase process will pass over or near any particular point on the surface of the media multiple times, thereby greatly increasing the probability that all surfaces of the media are thoroughly erased. Thus, while erase spirals 210 may not be as closely spaced and accurately positioned as servo spirals used for the SSW process, complete or nearly complete erasure of a recording surface in HDD 100 can be achieved.

In some embodiments, erase spirals 210 are written at a significantly slower radial velocity than that employed in writing conventional reference spirals. For example, on the order of 100-200 mm/s. Consequently, the slope of erase spirals 210 is significantly lower than that of conventional reference spirals, and more sync marks can be detected by the servo system of HDD 100 as read/write head 127 crosses erase spirals 210.

In addition, in some embodiments erase spirals 210 are written with a signal frequency that is selected to be different than any signal frequency associated with data patterns previously written on that data recording surface, such as previously written spiral tracks, product wedges, other servo data, or user data. For example, in an embodiment of HDD 100 in which previously written coarse guide spirals or bootstrap spirals are formed with a write frequency of approximately 125 MHz, product servo wedges are formed with a write frequency of approximately 175 MHz, and user data have a write frequency of approximately 500 MHz, erase spirals 210 may be formed on surface 112 with a write frequency of approximately 200 MHz. In this way, during an in-drive erase process, the servo system of HDD 100 can be tuned to substantially ignore any signals read by read/write head 127 that have a frequency significantly different than 200 MHz. Thus, even though surface 112 has a significant quantity of previously written user and/or servo data written thereon, the in-drive erase process can be performed with little or no interference from such previously written data.

In step 1003, microprocessor-based controller 133 (or any other suitable control circuit or system) controls the writer in read/write head 127 at a radial location on surface 112 based on time and position information included in erase spirals 210. Generally, the time and position information are read by a reader in read/write head 127.

In step 1004, microprocessor-based controller 133 (or any other suitable control circuit or system) determines a spiral exit time at which the reader will encounter, or begin to encounter, a trailing edge of a particular erase spiral 210 at the radial location. Generally, at a particular radial location the servo system of HDD 100 tracks the circumferential location of erase spirals 210 with some accuracy, particularly after multiple revolutions at that particular radial location. Thus, determining the spiral exit time for the reader in step 1004 is typically a normal function of the servo system of HDD 100.

In step 1005, microprocessor-based controller 133 (or any other suitable control circuit or system) determines an erase start time 311 by modifying the spiral exit time determined in step 1004. Specifically, the spiral exit time is modified with the reader-to-writer timing offset value that has been determined for the current radial location of read/write head 127. As described above, the reader-to-writer timing offset value takes into account the orientation of read/write head 127 caused by skew angle, the radial offset on read/write head 127 between the reader and the writer, the circumferential offset on read/write head 127 between the reader and the writer, and the nominal slope of erase spirals 210.

In some embodiments, the erase start time 311 is selected so that the writer is more likely to be disposed over a portion of an erase spiral 210 at the erase start time 311. That is, an additional spiral erase margin is included in the determination of the erase start time 311. For example, the erase start time 311 determined in step 1005 can be selected to begin a certain time interval earlier than the time indicated by modifying the spiral exit time 311 with the reader-to-writer timing offset value.

In step 1006, microprocessor-based controller 133 (or any other suitable control circuit or system) controls the writer in read/write head 127 to write an erase pattern on the surface 112 at the current radial location. Microprocessor-based controller 133 (or any other suitable control circuit or system) controls the writer in read/write head 127 to begin writing the erase pattern at the erase start time 311 determined in step 1005.

In step 1007, microprocessor-based controller 133 (or any other suitable control circuit or system) determines a spiral encounter time at which the reader will encounter, or begin to encounter, a leading edge of the next erase spiral 210 at the radial location. Because the servo system of HDD 100 is configured to track the circumferential location of erase spirals 210 with some accuracy at a particular radial location, determining the spiral encounter time for the reader in step 1007 is typically a normal function of the servo system of HDD 100.

In step 1008, microprocessor-based controller 133 (or any other suitable control circuit or system) determines an erase stop time 312 by modifying the spiral encounter time determined in step 1007. Specifically, the spiral encounter time is modified with the reader-to-writer timing offset value that has been previously determined for the current radial location of read/write head 127. In some embodiments, the erase stop time 312 is selected so that the writer is more likely to be disposed over a portion of the erase spiral 210 being encountered at the erase stop time 312. That is, an additional spiral erase margin is included in the determination of the erase stop time 312. For example, the erase stop time 312 determined in step 1007 can be selected to begin a certain time interval later than the time indicated by modifying the spiral exit time with the reader-to-writer timing offset value.

In step 1009, microprocessor-based controller 133 (or any other suitable control circuit or system) controls the writer to discontinue writing the erase pattern on surface 112 at the current radial location. Microprocessor-based controller 133 (or any other suitable control circuit or system) controls the writer to discontinue writing the erase pattern at the erase stop time 312 determined in step 1005.

Implementation of method 1000 at each radial location of surface 112, such as at each data storage track location, and between each pair of adjacent erase spirals 210, enables the erasure of surface 112 in a single-surface HDD without external equipment or disassembly of the HDD. In some embodiments, method 1000 is employed multiple times at each such radial location, to ensure that surface 112 is thoroughly erased. Alternatively or additionally, read/write head 127 seeks across the erase surface in radial steps that are significantly smaller than the width of a single data storage tracks on surface 112, so that each data storage track location is nominally passed over multiple times by read/write head 127 while performing the erase process.

In some embodiments, method 1000 is employed across most or all of surface 112, from ID 201 to OD 202. In other embodiments, method 1000 is employed in mid-diameter region 203 (shown in FIG. 2), while other methods are employed for erasing the remainder portions of surface 112. Specifically, outside mid-diameter region 203 the reader and writer are sufficiently offset radially, so the reader of read/write head 127 can read timing and position signals from erase spirals 210 in one radial location, while the writer of read/write head 127 can unconditionally erase all signals, including erase spirals 210, at a different radial location. In this way, surfaces outside mid-diameter region 203 can be erased without an erase window 310.

In sum, embodiments described herein enable an in-drive erase process to be performed in a single-surface HDD. By determining a reader-to-writer timing offset value for a plurality of radial locations on the surface to be erased, erase spirals on the surface being erased can be employed to control writer position during the erase process. As part of the erase process, an erase window is determined for a radial location disposed between two erase spirals. The erase window prevents erasure of too much of the adjacent erase spirals, so that the servo system of the HDD can continue to servo off of the erase spirals. The erase window includes an erase start time, at which a writer begins writing an erase pattern at the radial location, and an erase stop time, at which the writer discontinues writing the erase pattern. The erase stop time is based on a spiral encounter time of a reader and a reader-to-writer timing offset value, and the erase start time is based on a spiral exit time of the reader and the reader-to-writer timing offset value.

While the foregoing is directed to embodiments of the present invention, other and further embodiments of the invention may be devised without departing from the basic scope thereof, and the scope thereof is determined by the claims that follow.

We claim:

1. A method of erasing a data recording surface of a data storage device, the method comprising:
controlling a writer to write a spiral track on the data recording surface; and
while controlling the writer at a radial location on the data recording surface based on time and position information included in the spiral track, controlling the writer to write an erase pattern on the data recording surface by:
(i) determining a spiral encounter time at which a reader associated with the writer will cross a leading edge of the spiral track at the radial location;
(ii) determining an erase stop time based on the spiral encounter time and a reader-to-writer timing offset value; and
(iii) controlling the writer to discontinue writing the erase pattern at the erase stop time.

2. The method of claim 1, wherein the reader-to-writer timing offset value is a function of the radial location of the reader.

3. The method of claim 1, wherein the reader-to-writer timing offset value is a function of a radial offset between the writer and the reader and a circumferential offset between the writer and the reader.

4. The method of claim 1, further comprising:
determining a spiral exit time at which the reader will cross a trailing edge of an adjacent spiral track that immediately precedes the spiral track;
determining an erase start time based on the spiral exit time and the reader-to-writer timing offset value; and
controlling the writer to continue writing the erase pattern at the erase start time.

5. The method of claim 4, wherein determining the erase start time based on the spiral exit time and the reader-to-writer timing offset value comprises selecting the erase start time to occur a certain time interval earlier than a time indicated by modifying the spiral exit time with the reader-to-writer timing offset value.

6. The method of claim 5, wherein determining the erase start time based on the spiral encounter time and the reader-to-writer timing offset value comprises selecting the erase start time to occur when the writer is disposed over a portion of the adjacent spiral track.

7. The method of claim 1, wherein a signal frequency associated with the spiral track is a different frequency than any signal frequency associated with patterns previously written on the data recording surface.

8. The method of claim 7, wherein the patterns written on the data recording surface include at least one of spiral tracks, product wedges, other servo data, or user data.

9. The method of claim 1, wherein the erase pattern is written at the radial location for multiple revolutions of the data recording surface.

10. The method of claim 1, wherein determining the erase stop time based on the spiral encounter time and the reader-to-writer timing offset value comprises selecting the erase stop time to occur a certain time interval later than a time indicated by modifying the spiral encounter time with the reader-to-writer timing offset value.

11. The method of claim 1, wherein determining the erase stop time based on the spiral encounter time and the reader-to-writer timing offset value comprises selecting the erase stop time to occur when the writer is disposed over a portion of the spiral track.

12. The method of claim 1, wherein controlling the writer to write the spiral track on the data recording surface comprises controlling the radial motion of the writer at a radial velocity that is no greater than 100 millimeters per second.

13. A data storage device comprising:
a rotatable disk with a writable surface; and
a controller configured to:
control a writer to write a spiral track on the writable surface; and
while controlling the writer at a radial location on the writable surface based on time and position information included in the spiral track, control the writer to write an erase pattern on the writable surface by:
(i) determining a spiral encounter time at which a reader associated with the writer will cross a leading edge of the spiral track at the radial location;
(ii) determining an erase stop time based on the spiral encounter time and a reader-to-writer timing offset value; and
(iii) controlling the writer to discontinue writing the erase pattern at the erase stop time.

14. The data storage device of claim 13, wherein the reader-to-writer timing offset value is a function of the radial location of the reader.

15. The data storage device of claim 13, wherein the reader-to-writer timing offset value is a function of a radial offset between the writer and the reader and a circumferential offset between the writer and the reader.

16. The data storage device of claim 13, further comprising:
determining a spiral exit time at which the reader will cross a trailing edge of an adjacent spiral track that immediately precedes the spiral track;
determining an erase start time based on the spiral exit time and the reader-to-writer timing offset value; and
controlling the writer to continue writing the erase pattern at the erase start time.

17. The data storage device of claim 16, wherein determining the erase start time based on the spiral exit time and the reader-to-writer timing offset value comprises selecting the erase start time to occur a certain time interval earlier than a time indicated by modifying the spiral exit time with the reader-to-writer timing offset value.

18. The data storage device of claim 17, wherein determining the erase start time based on the spiral encounter time and the reader-to-writer timing offset value comprises selecting the erase start time to occur when the writer is disposed over a portion of the adjacent spiral track.

19. The data storage device of claim 13, wherein a signal frequency associated with the spiral track is a different frequency than any signal frequency associated with patterns previously written on the data recording surface.

20. The data storage device of claim 13, wherein determining the erase stop time based on the spiral encounter time and the reader-to-writer timing offset value comprises selecting the erase stop time to occur a certain time interval later than a time indicated by modifying the spiral encounter time with the reader-to-writer timing offset value.

* * * * *